Patented Jan. 29, 1952

2,583,964

UNITED STATES PATENT OFFICE 2,583,964

METHOD OF PREPARING FISH FOOD

Harold S. Otter, St. Ignatius, Mont.; Faye E. Otter, administratrix of said Harold S. Otter, deceased, assignor to Processed Trout Foods, Incorporated, a corporation of Montana No Drawing. Application July 26, 1949, Serial No. 106,961

6 Claims. (Cl. 99—2)

My invention relates to improvements in a method of preparing fish food.

Extensive tests carried on by Federal, State and Commercial Hatcheries, including my own, have proven that trout can be fed cooked meats, grains and cereals for short periods of time, but not extensively. Raw meat has to be included in their diet in order to sustain normal health and growth.

The known substances and chemicals that are in raw meat can be produced artificially, synthetically or substituted, but when fed in their proportion to raw meat, the trout show a rapid decline in health. My conclusion, as well as others, is that in raw meat, there remains a substance that cannot be isolated. For references, I will refer to this substance as Factor H, as has been done in previous studies of this nature. I, as well as others, have also proven that the addition of various cereals, grains and minerals to the raw meat diet, will increase growth, vitality and natural coloring of trout. Due to the fact that raw meats, cereals, grains, etc. when mixed together without a suitable binder will disintegrate when brought in contact with water during the process of feeding such a mixture has two distinct disadvantages. Inasmuch as the meat is more palatable to fish and is readily eaten, the remaining ingredients wash away and are wasted, which in turn, from an economical standpoint, is prohibitive. This washing away clouds the water. The water in turn passes through the fish gills and the small particles become clogged in the gill filaments which in turn causes suffocation as well as irritation of the gill, leaving a vulnerable place for infection, commonly known as gill disease.

It has been further proven by my tests that the digestive system of a fish will not readily absorb excessive fat which is found in meat and other foods. When the percentage of fat in the food exceeds 5% by weight, the liver of the fish begins to degenerate, also the undigested fat is very noticeable by the long string-like feces or excrement from the fish. As this feces is not digested or chemically changed, it remains an organic matter, accumulating on the bottom of the pond or raceway where the fish are being held. This undigested excrement, since it will not readily wash away, accumulates in bunches depending on water currents, and goes through a chemical change in the water and releases gases and acids which are detrimental to the health of the trout. Another factor that I have proven, is that trout cannot be fed concentrated foods which run over 15% protein and maintain good health. When raw meat is fed to trout, ground in particles large enough for them to seize in the water, my tests have shown that the fish's stomach does not work to full efficiency in digesting these large particles and considerable amounts of this food is passed off in the feces in an undigested state.

It is the principal purpose of my invention to provide an improved food for fish which overcomes the distinct disadvantages set forth above and which can be fed in a near duplication of the natural feeding of the trout.

It is also a purpose of my invention to improve the preparation of a fish food including the necessary raw meat containing the Factor H, by which the dangers of fermentation of the food from the time it is made until it is fed are avoided. My improved method involves certain critical temperature controls in the preparation of food which must be maintained. Otherwise the quality of the food is deteriorated and its feeding value is lost, in fact, failure to adhere strictly to the method may result in a food change which will kill the fish if it is given to them.

In the preparation of the food I prefer to utilize certain dry ingredients which are prepared and assembled separately and then added to the mixture. The ingredients are as follows:

Fish meal or fish liver oils, 5% contains pathothenic acid vitamin D (antirachitic)
Wheat middlings, 20% contains thiamin—pantothenic acid
Wheat germ, 20% contains niacin—tocopherol
Dried whey or dried milk, 20% contains riboflavin
Alfalfa meal or carrot meal, 5% contains carotene—vitamin A
Mineral or yeast, 10% contains thiamin, riboflavin, niacin pyridoxine, pantothenic acid biotin
Meat meal, 20% contains riboflavin, pantothenic acid amino acids These ingredients are placed in a dry mixer and mixed thoroughly for 30 minutes. 20 pounds of this dry mix is used for every 500 pounds of finished product. The proportions given are measured by weight.

The raw meat and blood products used in the food are separately prepared. The meat is obtained from such sources as animal lungs, horse meat, tripe, livers, spleens, and the blood of course, is natural fresh animal blood. An example of the preparations used is set forth below.

80 pounds trimmed animal lungs or trimmed lean horse meat
80 pounds scalded animal tripe
80 pounds liver, spleen or melts
20 pounds liquid blood (natural)

} Factor H.

This product when prepared is used in the proportion of 260 pounds for every 500 pounds finished product.

The meat is first trimmed of excess fat and sliced or cut into pieces that may be ground. It is then placed, with the blood, under refrigeration and reduced to freezing temperature. According to one way of preparation the meat is ground while still in the frozen state into particles substantially five-sixty fourths of an inch and less in diameter. The friction and heat generated in grinding normally brings the frozen meat to a temperature of approximately 32 degrees F. I then place the meat in a mixer of the type commonly used in sausage making or mixing bread dough and add the dry mix slowly while the mixer is in operation. I then add the blood and continue the mixing. The combined mixture must remain below 45 degrees F. to avoid fermentation or souring. To be safe in all cases I hold it at 35 degrees F. Ordinarily mixing for 1 minute after adding the blood is sufficient before adding the binder.

I prepare a binder for the meat and dry mix by using fine granulated gelatine and pure acid free water and salt. The proportions are 1 pound of gelatine and ¾ of a pound of salt for 20 pounds of water. I first soften the gelatine in 25 percent of the water at a temperature of 40 degrees F. allowing the water and gelatine to stand for 15 or 20 minutes. Another 25 percent of the water is heated to 180 degrees F. and poured into the gelatine and water mixture, the mixture being stirred until it is smooth and free of lumps. The salt is then added and the mixture stirred until the salt is dissolved. The remaining 50 percent of the water is held at a temperature of approximately 50 degrees F. and added to the solution. At this point the temperature must be reduced to 70 degrees F. and held above 67 degrees F. This mixture must be poured into the other ingredients while at this temperature range. I use 220 pounds of the above mixture for every 500 pounds of a finished product. If the temperature of the solution is above 70 degrees F. fermentation will be encouraged and if it is below 67 degrees F. the final mixture will not be smooth but will be inclined to be lumpy and not hold together.

The binder just described is added to the meat, blood and dry material mixture as the mixing continues. In a 500 pound batch, I add the binder at the rate of 10 gallons a minute. The temperature of the binder, when added to the mixture must not exceed 70 degrees F. The mixture, after adding all of the binder, is further mixed for about three minutes. Its temperature at this stage must not exceed 50 degrees F.

The method of mixing the meat portion of the food and the way in which the other portions are added must be varied somewhat when the so-called silent cutter is used. This is a combined slicer and mixer that operates at high speed. The meat portion of the food in this variation of the method is placed in the silent cutter which is operated for about six minutes to reduce the particle sizes of the meat to about the size they are reduced to in the grinder. The refrigerated blood and the dry mix are then added in the silent cutter which is then run for an additional four minutes. During all this time of the operation of the cutter the temperature therein must be watched very closely so as not to exceed 44 degrees F. Preferably I maintain the temperature at or below 38 degrees F. Some failures due to souring may occur at temperatures of 44 degrees F. The 50 percent of the water which would normally be added to the gelatine after it is dissolved in the hot water is frozen and shaved to provide a shaved ice. The shaved ice is used during the operation of the cutter to keep the contents of the cutter below the desired maximum temperature of 38 degrees F. At the end of the ten minutes the balance of the ice, if any, is added to the mixture in the cutter and the cutter is allowed to run until all of the ice particles are dissolved. The hot dissolved gelatine and salt solution is then poured over the contents of the cutter and the cutter is operated for an additional two or three minutes. The cutter must not be operated long enough to raise the temperature of the contents above 50 degrees F.

In both methods the final mixture is allowed to set for approximately five minutes to complete the congealing process. The final product from either of the foregoing methods of mixing is now removed and placed in shallow containers (not over 5½ inches in depth) and placed under refrigeration temperatures of zero F. to 10 degrees below zero F. The reason for making the containers shallow is to extract the heat from the mixture before fermentation sets in. When fermentation has begun the material will not set or congeal and the purpose of congealing is defeated. After the material in the container is frozen solid, covers may be applied and the product is then stored in a temperature at least as low as zero F. until it is used.

It is important to maintain mixture temperatures and refrigeration temperatures. The refrigeration units should have a capacity sufficient to freeze the product to a solid state in twenty-four hours or less. If this is not accomplished fermentation may begin and the resultant food will be detrimental to the fish growth. The necessity for the low storage temperature is to prevent bacterial growth in the food. I have found that bacteria will grow in this food at temperatures of 4 degrees F.

When the food is to be fed, it is removed from the freezer in ample time to enable it to thaw enough to remove it from the container. At 70 degrees F. about one hour is sufficient. The block, when removed from the container, can be cut into strips with a knife or a cleaver to a size small enough to pass through the throat of a meat grinder. The food is ground while in a frozen state and the plate of the grinder will determine the size and diameter of the food. For smaller fish a grinder plate with small openings is used. The food comes from the grinder in small worm-like separate pieces and is then promptly scattered over the feeding area.

The food at this temperature, just below freezing, has a buoyancy in water due to its expansion, which prevents it from sinking rapidly to the bottom of the water. Trout waters are maintained at less than 60 degrees F. temperature in order to have the trout healthy. The gelatine, which is a binder for all the food ingredients, remains substantially insoluble at such temperatures and prevents any leaching of the food. The gelatine acts as a binder and keeps all of the small particles of food in suspension. When the food enters the stomach of the fish, the acids of the stomach first attack the gelatine and it is absorbed into the system as a food. The suspension of the food particles in gelatine as the food enters the fish's stomach also enables the digestive acids to completely surround all of the food particles as the gelatine is being digested and absorbed into the system. This greatly aids in enabling the fish to completely digest each food particle. The gelatine also acts as a bulk food which in turn keeps the protein content of the food below the critical 15 percent.

Preparing the raw meat with gelatine and added dry foods in this manner does not destroy the Factor H mentioned hereinbefore. This food has been fed exclusively to fish held in ponds, raceways, and troughs for as long as 18 months. Thorough examination of the fish after being so fed, showed them to be in excellent condition. The excrement of the fish during this period caused no problem. It was not stringy or adhesive and was readily removed by the water current.

The particles of food, when prepared and fed as described hereinbefore, are self-contained as if placed in individual gelatin capsules. They appear like worms in the water. At the normal 60 degrees F. and below temperature of trout waters, the gelatine retains its body until seized by the fish. Tests have shown that the conversion of my improved fish food into fish growth is at the rate of four pounds of food per pound of gain in fish weight. Other foods tried in comparison ran six pounds to ten pounds of food per pound of gain in fish weight.

I attribute the effectiveness of this food to its characteristics which enable the fish to take and digest the food with the minimum waste and to the preparation which insures a healthy food at the time it is fed.

Distribution of the food particles in a finely divided state in the gelatine, enables the gelatine, also a digestible food, to hold the meats, fat etc. while digestion takes place slowly. There is never any heavy, single concentration of meat, or other food, in the digestive tract of the fish. The gelatine on all particles allows the fish sufficient time to rid its stomach of the waste between feedings. The gelatine prevents loss of food in the water, since it holds the particles together and the food cannot leach or dissolve into the water. The blood is, of course, distributed in the gelatine as are other liquid portions of the raw meat. This makes the product quite attractive to the fish as a food.

The nature and advantages of my invention are believed to be apparent from the foregoing description. Having described my invention,

I claim:

1. A method of preparing a fish food including raw meat, natural animal blood and a small amount of other vegetable and animal matter in form for ready feeding, said method comprising freezing and then comminuting the raw meat portion, then mixing the animal blood and the other vegetable and animal matter therewith while maintaining its temperature below 50 degrees F., thereafter coating the particles with a gelatine in water solution, freezing the resultant mixture and then grinding it while frozen, for feeding.

2. A method of preparing a fish food including raw meat and minor amounts of other vegetable and animal substances, said method comprising initial freezing of the raw meat portion, then dividing the meat into fine particles and mixing the other substance therewith while maintaining the meat at a temperature of about 38 degrees F., coating the mixed particles with a gelatine in water solution and thereafter freezing the mixture.

3. The method of preparing a fish food which comprises adding to a mixture of finely divided raw particles, blood and finely divided vegetable matter particles, a sufficient quantity of a gelatine in water solution, to coat the solid particles and freezing the mixture, then forming the mixture, while frozen, into worm-like pieces for feeding.

4. The method of preparing a fish food which comprises adding to a mixture of finely divided raw meat particles, blood, and finely divided vegetable matter particles at a temperature below 44 degrees F., a sufficient quantity of a gelatine in water solution to coat the solid particles, then holding the mixture quiescent at a temperature below 50 degrees F. for a few minutes to set the gelatine, then freezing the mixture into solid blocks.

5. The method of preparing a fish food which comprises adding to a mixture of finely divided raw meat particles, blood, and finely divided vegetable matter particles at a temperature below 44 degrees F., a sufficient quantity of a gelatine in water solution to coat the solid particles, then holding the mixture quiescent at a temperature below 50 degrees F., for a few minutes to set the gelatine, freezing the mixture and forming it into worm-like pieces for feeding.

6. A method of preparing a fish food including raw meat and minor amounts of other vegetable and animal substance, said method comprising initial freezing of the raw meat portion, then dividing the meat into fine particles and mixing the other substances therewith while maintaining the meat at a temperature of about 38 degrees F., coating the mixed particles with a gelatine in water solution and thereafter freezing the mixture and dividing it into fine pieces, while frozen, for feeding.

HAROLD S. OTTER.

REFERENCES CITED

The following references are of record in the file of this patent:

UNITED STATES PATENTS

| Number | Name | Date |
|---|---|---|
| 742,293 | Curtis et al. | Oct. 27, 1903 |
| 871,486 | Debroisse | Nov. 19, 1907 |
| 871,935 | Henzel | Nov. 26, 1907 |
| 990,113 | Cowin | Apr. 18, 1911 |
| 1,914,351 | Hall et al. | June 13, 1933 |

FOREIGN PATENTS

| Number | Country | Date |
|---|---|---|
| 166,893 | Great Britain | of 1922 |

OTHER REFERENCES

"Baits," pub. by Bureau of Fisheries, Dept. of Commerce, Washington, D. C., January 1935, p. 2.

Fish Baits Fishery Leaflet 28, published by U. S. Dept. of Interior, Chicago, September 1946, p. 16.